US006597967B2

(12) United States Patent
Xi et al.

(10) Patent No.: US 6,597,967 B2
(45) Date of Patent: Jul. 22, 2003

(54) SYSTEM AND METHOD FOR PLANNING A TOOL PATH ALONG A CONTOURED SURFACE

(75) Inventors: Ning Xi, Okemos, MI (US); Weihua Sheng, E. Lansing, MI (US)

(73) Assignee: Board of Trustees operating Michigan State University, East Lansing, MI (US)

(*) Notice: Subject to any disclaimer, the term of this patent is extended or adjusted under 35 U.S.C. 154(b) by 209 days.

(21) Appl. No.: 09/795,573

(22) Filed: Feb. 28, 2001

(65) Prior Publication Data

US 2002/0120359 A1 Aug. 29, 2002

(51) Int. Cl.⁷ ............................................. G06F 19/00
(52) U.S. Cl. ..................... 700/184; 700/182; 700/183
(58) Field of Search ............................ 700/180–184, 700/195, 98

(56) References Cited

U.S. PATENT DOCUMENTS 6,405,095 B1 * 6/2002 Jang et al. ................. 700/118
6,438,445 B1 * 8/2002 Yoshida et al. ............. 700/173

OTHER PUBLICATIONS

W. Sheng, N. Xi, M. Song, Y. Chen, J. S. Rankin III, "Automated CAD–Guided Automobile Part Dimensional Inspection", Proceedings of the 2000 IEEE International Conference on Robotics and Automation, San Francisco, California, Apr. 2000.

W. Sheng, N. Xi, M. Song, Y. Chen, P. MacNeille, "Automated CAD–Guided Robot Path Planning for Spray Painting of Compound Surfaces", Proceedings of the 2000 IEEE/RS International Conference on Intelligent Robots and Systems.

M. Marefat, R. L. Kashyap, "Automatic Construction of Process Plans from Solid Model Representations", IEEE Transactions on Systems, Man, and Cybernetics, vol. 22, No. 5, Sep./Oct. 1992.

G. K. Cowan, P. D. Kovesi, "Automatic Sensor Placement from Vision Task Requirements", IEEE Transactions on Pattern Analysis and Machine Intelligence, vol. 10. No. 3, May 1988.

G. Hu, G. Stockman, "3–D Surface Solution Using Structured Light and Constraint Propagation", IEEE; Transactions on Pattern Analysis and Machine Intelligence, vol. 11, No. 4, Apr. 1989.

K. Tarabanis, R. Y. Tsai, P. K. Allen, Analytical Characterization of the Feature Detectability Constraints of Resolution, Focus, and Field–of–View for Vision Sensor Planning, CVGIP: Image Understanding, vol. 59, No. 3, May, pp. 340–358, 1994.

(List continued on next page.)

*Primary Examiner*—Leo Picard
*Assistant Examiner*—Alexander Kosowski
(74) *Attorney, Agent, or Firm*—Harness, Dickey & Pierce, P.L.C.

(57) ABSTRACT

A automated manufacturing system is provided for performing a manufacturing operation along a contoured surface of a workpiece. The automated manufacturing system includes a movable member; a tool disposed on the movable member for performing a manufacturing operation; a path planning subsystem which is operable to generate path data based on dimensional data for the workpiece, where the path data is indicative of a path for traversing the tool along the surface of the workpiece; and a controller adapted to receive the path data from the path planning subsystem and operable to move the moveable member in accordance with the path data, thereby performing the manufacturing operation along the surface of the workpiece.

23 Claims, 8 Drawing Sheets

OTHER PUBLICATIONS

S.H. Suh, I.K. Woo, S.K Noh, "Development of An Automatic Trajectory Planning System (ATPS) for Spray Painting Robots", Proceedings of the 1991 IEEE International Conference on Robotics and Automation Sacramento, California, Apr. 1991.

S. Sakane, M. Ishii, M. Kakikura, "Occlusion Avoidance of Visual Sensors Based On a Hand–Eye Action Simulator System: HEAVEN", Advanced Robotics, vol. 2, No. 2, pp. 149–165, 1987.

S. Sakane, R. Niepold, T. Sato, Y. Shirai, "Illumination Setup Planning For a Hand–Eye System Based On an Environmental Model", Advanced Robotics, vol. 6, No. 4, pp. 461–482, 1992.

R. Ramabhadran J.K. Antonio, "Fast Solution Techniques For a Class of Optimal Trajectory Planning Problems with Applications to Automated Spray Coating", IEEE Transactions on Robotics and Automation, vol. 13, No. 4, Aug. 1997.

K. A. Tarabanis, P. K. Allen, R. Y. Tsai, "A Survey of Sensor Planning in Computer Vision", IEEE Transactions on Robotics and Automation, vol. 11, No. 1, Feb. 1995.

K. A. Tarabanis, R. Y. Tsai, P. K. Allen, "The MVP Sensor Planning System for Robotic Vision Tasks", IEEE Transactions on Robotics and Automation, vol. 11, No. 1, Feb. 1995.

R. Ramabhadran, J. K. Antonio, "Planning Spatial Paths for Automated Spray Coating Applications", Proceedings of the 1996 IEEE International Conference on Robotics and Automation, Minneapolis, Minnesota, Apr. 1996.

* cited by examiner

SYSTEM AND METHOD FOR PLANNING A TOOL PATH ALONG A CONTOURED SURFACE

BACKGROUND OF THE INVENTION

The present invention relates generally to an automated manufacturing system and, more particularly, a system and method for planning a tool path along a contoured surface of a workpiece in an automated manufacturing application.

Within the last decade, computer-aided design (CAD) and computer-aided manufacturing (CAM) have been extensively applied in the manufacturing industry. CAD technology is typically used to design one or more parts of a manufactured article. In the manufacturing process, automated robotic equipment is then used to weld, paint, gauge and assemble the parts into a manufactured article. For instance, a part may be painted using a paint gun that is moved along the surface of the part by a robot. Similarly, a part may be inspected for defects using a non-contact gauging sensor that is moved along the surface of the part by a robot. In either instance, CAM technology may be used to guide the motions of the robotic equipment.

In recent years, there has been a focus on how to use CAD information as a basis for determining the motions of robotic equipment used in the manufacturing process. In particular, it is desirable to use the CAD information to determine the path of the paint gun or the sensor as it moves along the surface of a part. Current approaches for planning the path of a tool along the surface of a part requires extensive human involvement. In other words, tool configuration and path planning are programmed by human operator into the controllers of the robotic equipment. As a result, the tool path planning process is time-consuming and prone to error.

Therefore, it is desirable to provide an automated system and method for planning a tool path along a surface of a workpiece in surface-based manufacturing applications. As a result, the set-up time and cost to make a new part can be significantly reduced and thereby improve the quality of the manufacturing process.

SUMMARY OF THE INVENTION

In accordance with the present invention, an automated manufacturing system is provided for performing a manufacturing operation along a contoured surface of a workpiece. The automated manufacturing system includes a movable member; a tool disposed on the movable member for performing a manufacturing operation; a path planning subsystem which is operable to generate path data based on dimensional data for the workpiece, where the path data is indicative of a path for traversing the tool along the surface of the workpiece; and a controller adapted to receive the path data from the path planning subsystem and operable to move the moveable member in accordance with the path data, thereby performing the manufacturing operation along the surface of the workpiece.

For a more complete understanding of the invention, its objects and advantages, reference may be had to the following specification and to the accompanying drawings.

DESCRIPTION OF THE PREFERRED EMBODIMENT

Figure 1:
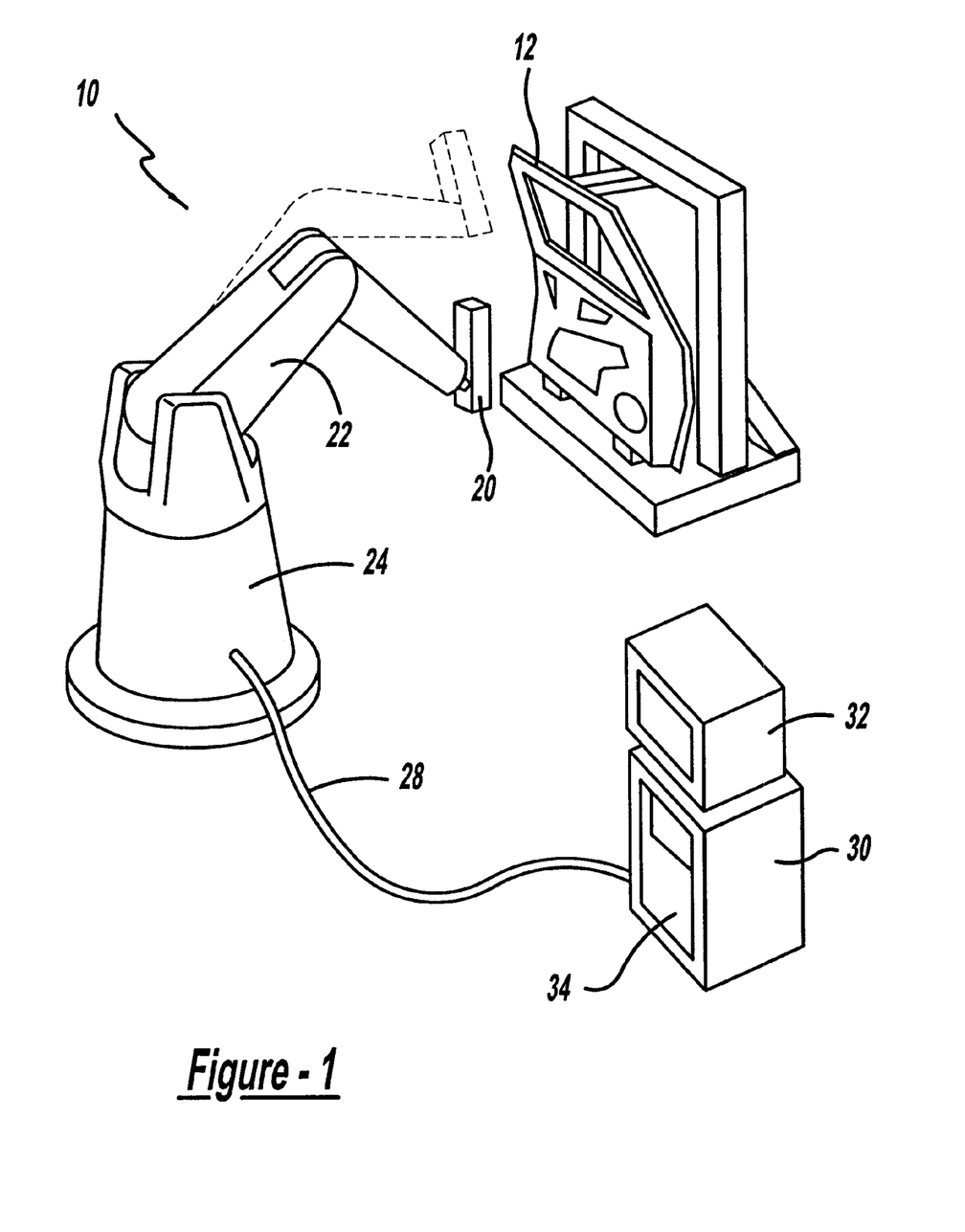
FIG. 1 is a perspective view of a surface inspection station on an automotive assembly line in accordance with the present invention.

An exemplary surface inspection system of the type commonly employed in an automotive assembly line is shown in FIG. 1. The surface inspection system 10 is used to ensure that each vehicle body component is assembled within predefined tolerances. For example, the surface inspection system 10 may measure the door of a vehicle body 12. Although the invention is not limited to automotive applications, an exemplary use for the surface inspection system of the present invention would be in an automotive assembly plant.

A single non-contact sensor 20 is mounted on a robot arm 22 of a robot 24. An exemplary sensor is disclosed in U.S. Pat. No. 4,645,348 which is incorporated by reference herein. During operation, the sensor 20 emits a planar structured light pattern. By illuminating the workpiece (for example, the door), a characteristic reflected light pattern is achieved which can be detected by the sensor 20. The sensor 20 can measure (through triangulation) in two dimensions a plane on the reflecting workpiece. In order to inspect the entire surface of the workpiece, the robot arm 22 is movable to a plurality of positions along the periphery of a workpiece. Communication cables 28 connect the sensor 20 and the controller of the robot 24 to a machine vision computer 30. The machine vision computer may include a display device 32 and a printer 34.

Figure 2:
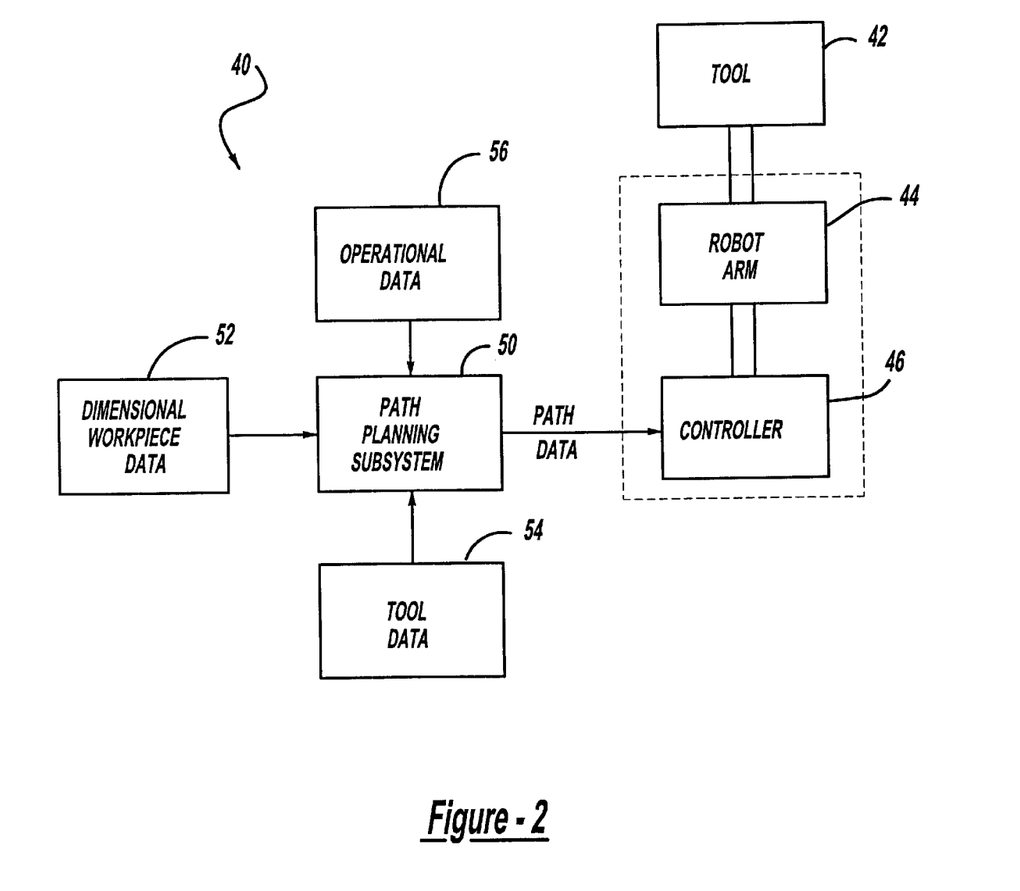
FIG. 2 is a diagram depicting a framework for implementing an automated manufacturing system in accordance with the present invention.

In accordance with the present invention, a framework 40 for performing an automated manufacturing operation along the surface of the workpiece is illustrated in FIG. 2. In particular, the framework 40 has been applied to inspecting a surface using the above-described surface inspection system. While the following description is provided with reference to a surface inspection system, it is readily understood the broader aspects of the present invention are applicable to other manufacturing applications.

The framework 40 generally includes a tool 42 (for example, a non-contact gauging sensor), a movable member 44 (for example, a robot arm), a controller 46, and a path planning subsystem 50. The path planning subsystem 50 is adapted to receive dimensional data for the workpiece. In a preferred embodiment, the dimensional data may be CAD model data from a CAD system (not shown). The path planning subsystem 50 generates path data based on the dimensional workpiece data 52, such that the path data is indicative of a path for traversing the tool along the surface of the workpiece. The path planning subsystem 50 may also use tool data 54 and/or operational data 56 to determine the path data. Tool data 54 is indicative of the type of tool being used in the manufacturing operation. For example, tool data may specify the type of non-contact sensor, the resolution of the images captured by the sensor, or other information associated with the sensor. Operational data 56 provides operational parameters within which to perform the manufacturing operation. For example, a timeframe parameter for completing the inspection process.

The path planning subsystem 50 may be implemented in a personal computer or other well known computing device. The computing device may further includes a microprocessor and one or more memory storage devices. The processing associated with the path planning subsystem 50 is performed by one or more software-implemented application modules. It is to be understood that only relevant steps of the methodology are discussed below, but that other software-implemented instructions or modules may be needed to control and manage the overall operation of the path planning subsystem. In addition, the dimensional workpiece data, tool data and operational data are stored in data structures which are defined in a memory space associated with the one or more memory storage device.

The controller 46 is adapted to receive the path data from the path planning subsystem 50. The controller 46 is further operative to move the moveable member 44 in accordance with the path data. In this way, the tool 42 is moved along the surface of the workpiece, thereby performing the applicable manufacturing operation. It is also envisioned that the path planning subsystem 50 may be implemented directly into the controller 46.

Figure 3:
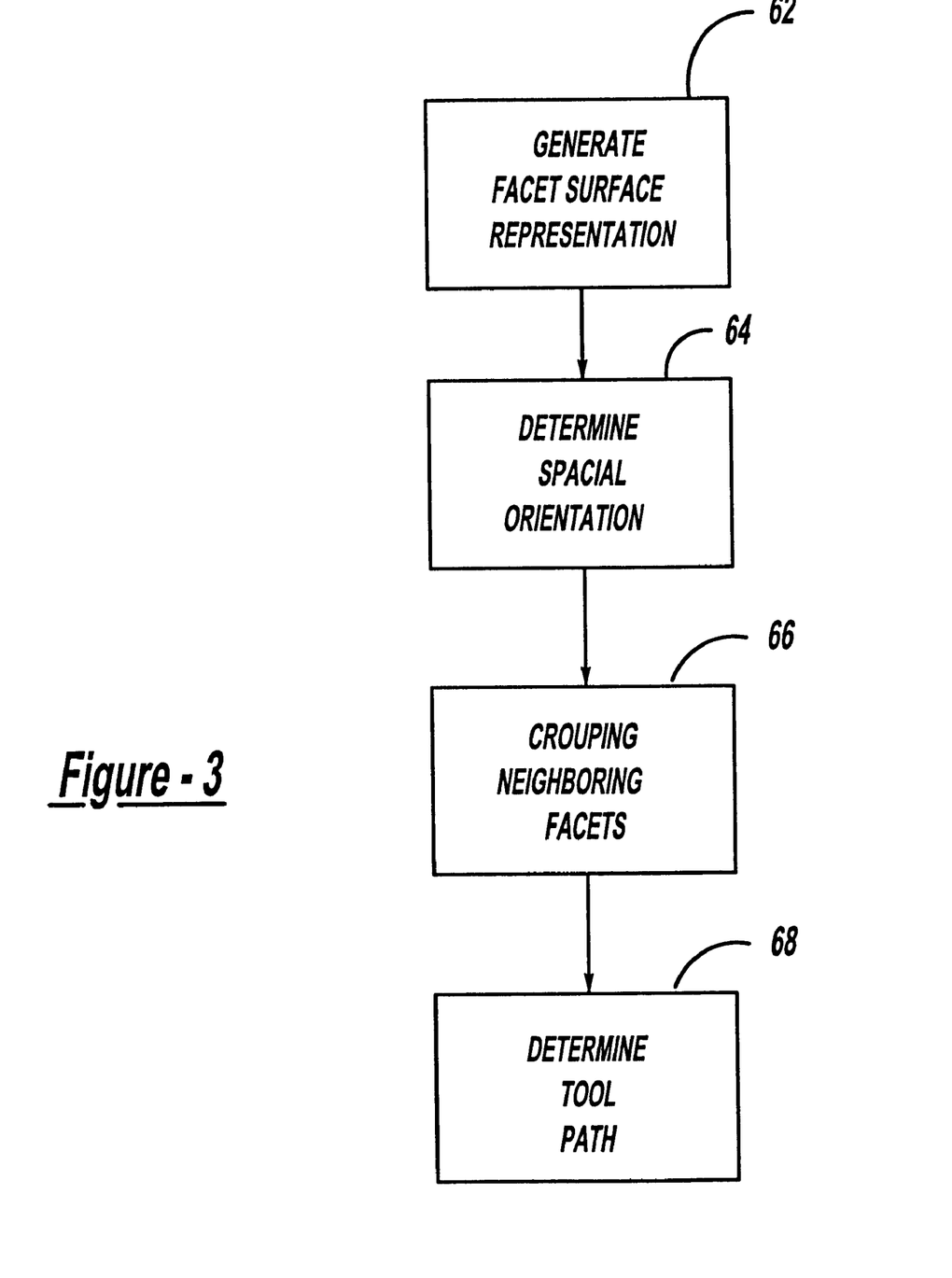
FIG. 3 is a flowchart showing a methodology for planning a tool path as employed by the path planning subsystem of the present invention.

FIG. 3 illustrates a more detailed methodology for planning a tool path as employed by the path planning subsystem 50. First, a facet representation is generated from the dimensional data for the workpiece as shown at 62. Triangular facet approximations may be used to represent the surface of the workpiece. It is envisioned that other geometric shapes may be used to approximate the surface. In addition, the deviation of the triangular facets from the actual surface of the workpiece can be controlled to meet the requirements of the specific manufacturing application.

Next, a spatial orientation is determined for each facet as shown at 64. In a preferred embodiment, a vector which is perpendicular to the surface of the facet is used to represent the spatial orientation of the facet. This vector is commonly referred to as the normal direction of the facet. It should be appreciated that other techniques may be used to represent the spatial orientation of the facet.

Due to the complexity of a part surface in a typical manufacturing application, it is difficult to plan a tool path using the plurality of facets. Rather, neighboring facets that satisfy certain geometric constraints are grouped together 66 to form patches of facets. As will be more fully explained, facets are grouped based on the spatial orientation of a facet in relation to the spatial orientation of other neighboring facets. The general principle is to group neighboring facets in order to form relatively flat patches of facets.

Figure 4:
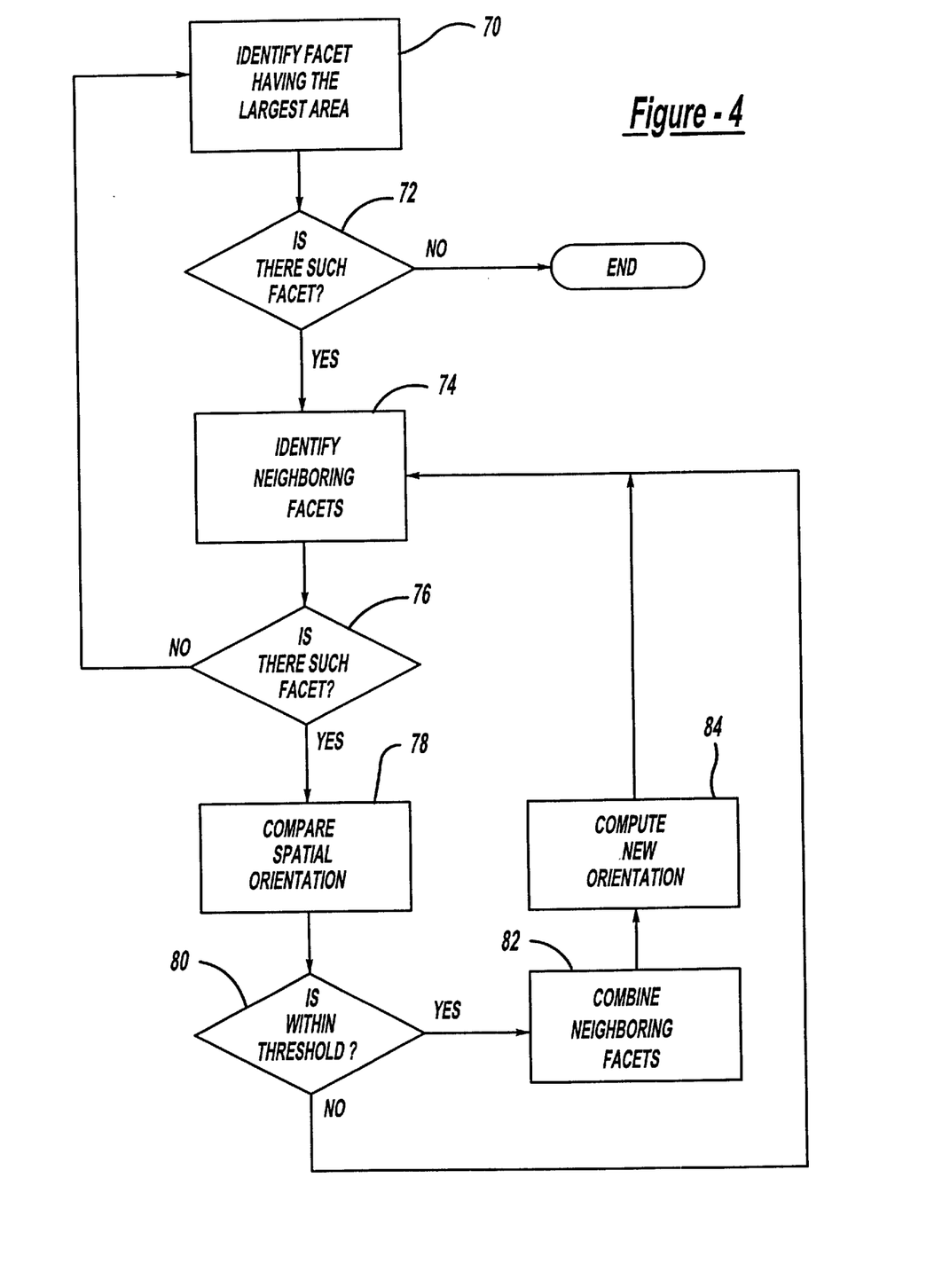
FIG. 4 is a flowchart showing a preferred technique for grouping neighboring facets in accordance with the present invention.

A preferred technique for grouping facets is further described in relation to FIG. 4. First, identify a facet having the largest area 70 amongst the plurality of facets. To do so, the area must be computed for each of the facets. The facet having the largest area may be referred to as the seed facet.

Next, identify a facet 74 which is adjacent (or neighboring) to the seed facet. For each neighboring facet, evaluate the spatial orientation of that neighboring facet in relation to the spatial orientation of the seed facet. More specifically, the area-weighted average normal is computed for each of the neighboring facet and the seed facet. The area-weighted average normal is computed by multiplying the normal direction of the facet by the area of the facet. The area-weighted average normal for the neighboring facet is compared 78 to the area-weighted average normal of the seed facet. If the angle between the area-weighted average normal for the neighboring facet and the area-weighted average normal of the seed facet is within some predefined threshold, then the neighboring facet may be combined (or grouped) 82 with the seed facet; otherwise the evaluation process is repeated for each of the neighboring facets of the seed facet.

If a neighboring facet is combined with the seed facet, then an area-weighted normal direction is computed 84 for the newly formed group of facets. The above-described process is then repeated for each of the neighboring facets to the newly formed group of facets. When the predefined threshold is exceeded for all of the neighboring facets in relation to either the seed facet or a subsequently formed group of facets, then a new seed facet must be identified to continue the grouping process.

From amongst all of the remaining uncombined facets, the facet having the largest area is designated the seed facet. The above-described grouping process is then repeated until all of the facets have been combined with other facets. In this way, facets are grouped together to form (relatively flat) patches of facets. It should be appreciated that other techniques may be suitable for grouping the facets that also fall within the broader aspects of the present invention.

Returning to FIG. 3, the groupings (or patches) of facets are then used to determine a tool path along the surface of the workpiece as shown at 68. One skilled in the art will readily recognize that the determination of the tool path varies based on the particular manufacturing operation. For instance, in the context of the surface inspection system, determining a tool path more specifically means identifying the viewpoints (i.e., the position and orientation) at which the sensor must capture image data in order to inspect the entire surface of the workpiece. The viewpoint of the sensor is based on various constraints relating to the sensor, including (but not limited to) visibility, field of view, resolution, and depth of field.

Figure 5:
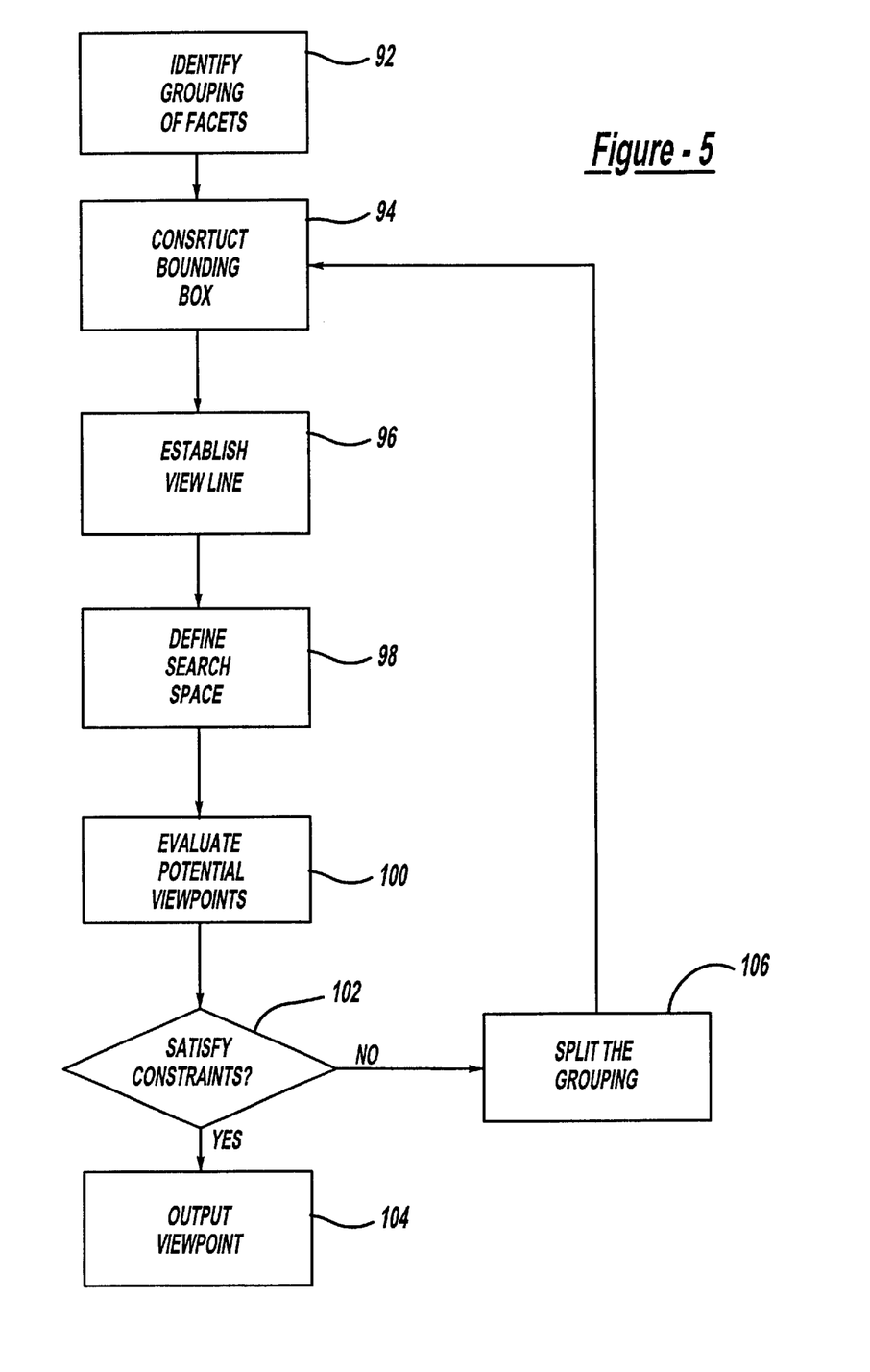
FIG. 5 is a flowchart depicting an exemplary approach for determining a viewpoint for a sensor in relation to a given grouping of facets in accordance with the present invention.
Figure 6:
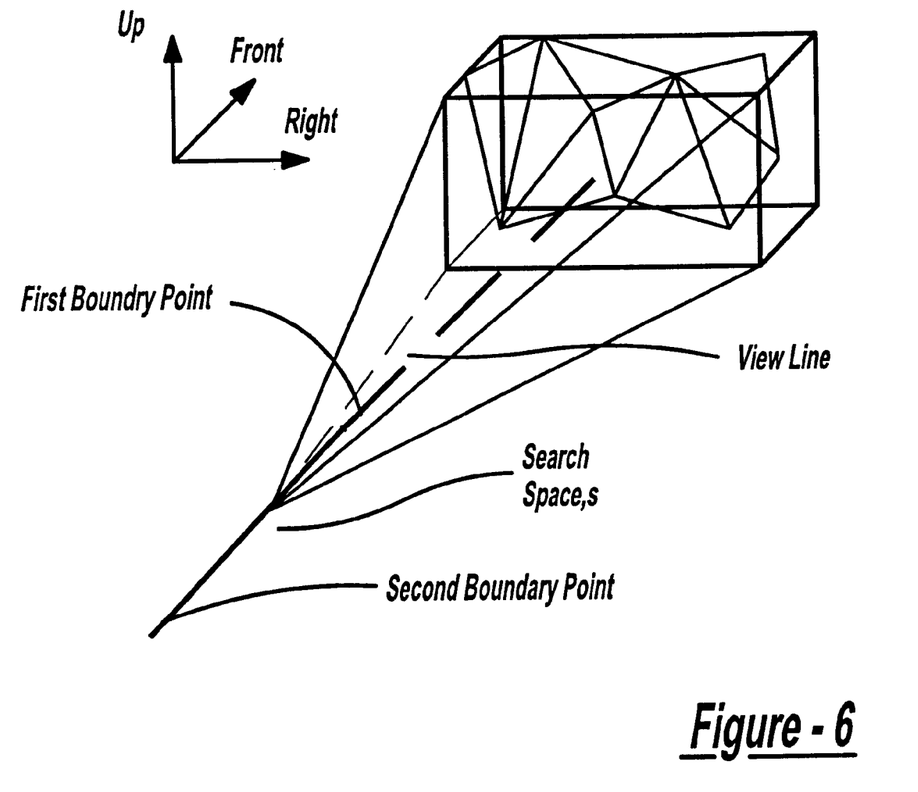
FIG. 6 is a diagram illustration how a viewpoint is determined for a sensor in relation to a given grouping of facets in accordance with the present invention.

An exemplary approach for determining a tool path for a sensor in a surface inspection system is provided in FIG. 5. Initially, a group of facets is selected 92 from the groupings of facets as formed by the above-described grouping process. A bounding box is then constructed 94 for the selected group of facets as shown in FIG. 6. To construct the bounding box, the opposite direction of the area-weighted average normal of the selected group is chosen as the front direction for the box. All of the vertices are then projected on the front direction to determine two end vertices: the nearest one and the farthest one. Each of the vertices on the selected group are projected onto the plane that is perpendicular to the front direction and passes through the nearest vertex on the front direction. To determine the up and right direction, two-dimensional rotations of the rectangular field of view are carried out until all of the projected vertices are within the field of view.

A view line for the sensor is established 96 using a perpendicularly extending center line from the constructed bounding box. It is along the view line that a viewpoint for the sensor may be identified. To facilitate the search for a viewpoint, a search space is defined 98 along a portion of the view line. More specifically, the search space is defined between two points on the view line: a first point that is as close to the bounding box such that the entire selected group can be viewed by the sensor, and a second point that is far away from the bounding box and yet within the depth of view at which the selected group must be viewed by the sensor.

Next, a trial and error approach is used to evaluate various points within the search space 100 as potential viewpoints for the sensor. At each discrete position within the search space, the resolution constraints and/or other operational parameters for the manufacturing operation are evaluated. For instance, is the resolution constraint met for this particular sensor when placed at this particular position. If the resolution constraint and/or each of the other operational parameters are met by this particular position, then it is deemed to be a viewpoint 104 for the sensor. If the resolution constraint and/or other operational parameters are not met, then another discrete position within the search space is evaluated until at least one satisfies the resolution constraint and/or each of the other operational parameters.

If none of the discrete positions within the search space satisfy the resolution constraints and/or the other operational parameters, then the selected group of facets is too large to be inspected at only one viewpoint by the sensor. In this case, the selected group of facets is split 106 into two groups of facets. It is envisioned that the selected group of facets will be split along a center plane of the constructed bounding box. A viewpoint can then be determined for each of the two smaller groupings of facets in accordance with the above-described process. The overall process is repeated until a view point has been determined for each grouping of facets.

Lastly, the series of viewpoints are used to plot a tool path for the sensor. The sensor is moved from viewpoint to viewpoint until the entire surface of the workpiece has been inspected. It should be appreciated that various known optimization algorithms may be used to determine an order at which the sensor is moved from viewpoint to viewpoint.

Surface painting is another exemplary manufacturing operation that may be automated in accordance with the present invention. The methodology for automating this operation is generally as described in relation to FIGS. 3 and 4. However, as previously noted, the approach for determining a tool path may be dependent on the particular manufacturing application.

Figure 7:
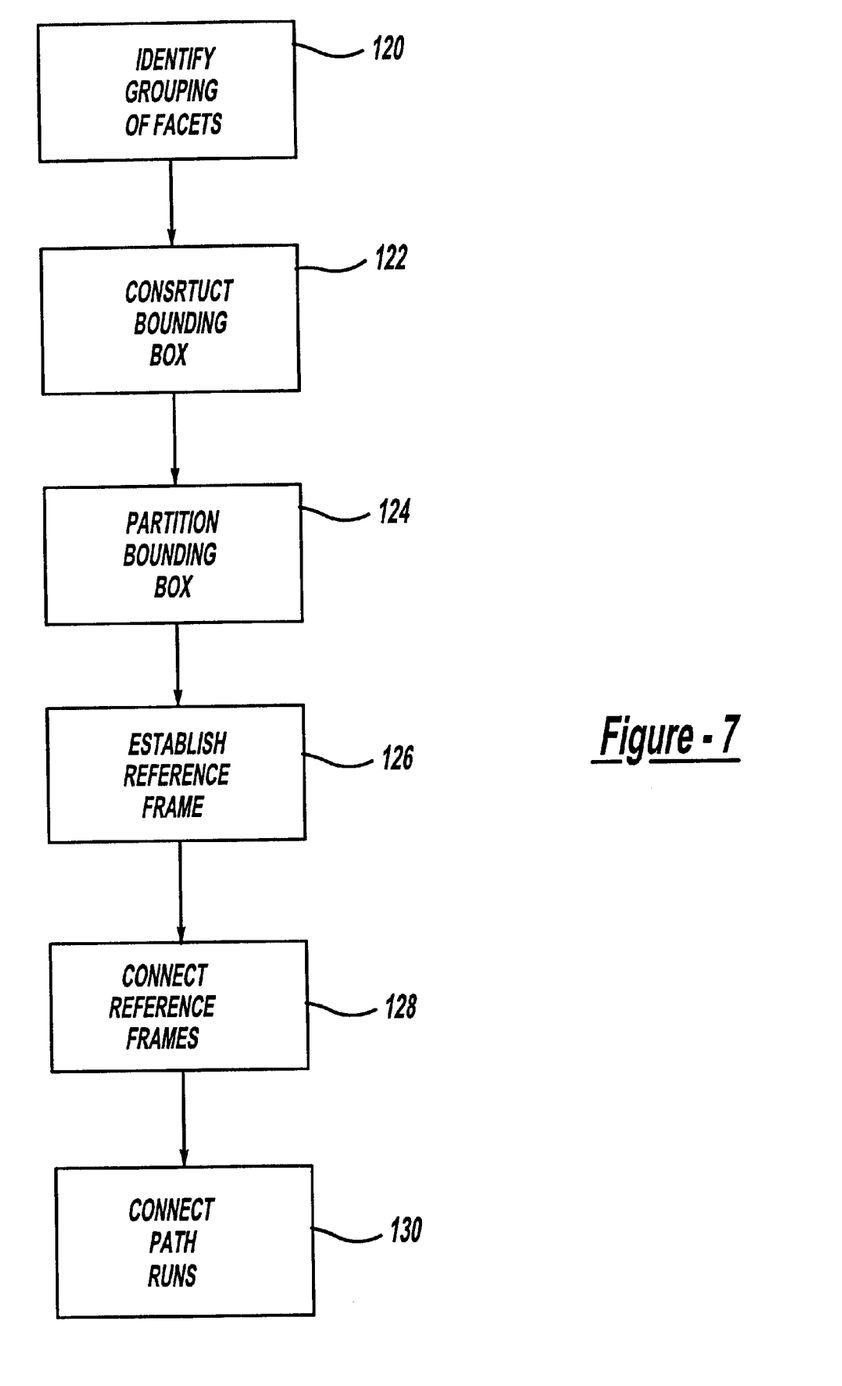
FIG. 7 is a flowchart depicting an exemplary approach for determining a paint gun path in relation to a given grouping of facets in accordance with the present invention.

FIG. 7 illustrates an approach for determining a tool path for a paint gun in a surface painting system. First, a group of facets is selected 120 from the groupings of facets that represent the workpiece. Next, a bounding box is constructed 122 for the selected group of facets as described above.

Figure 8:
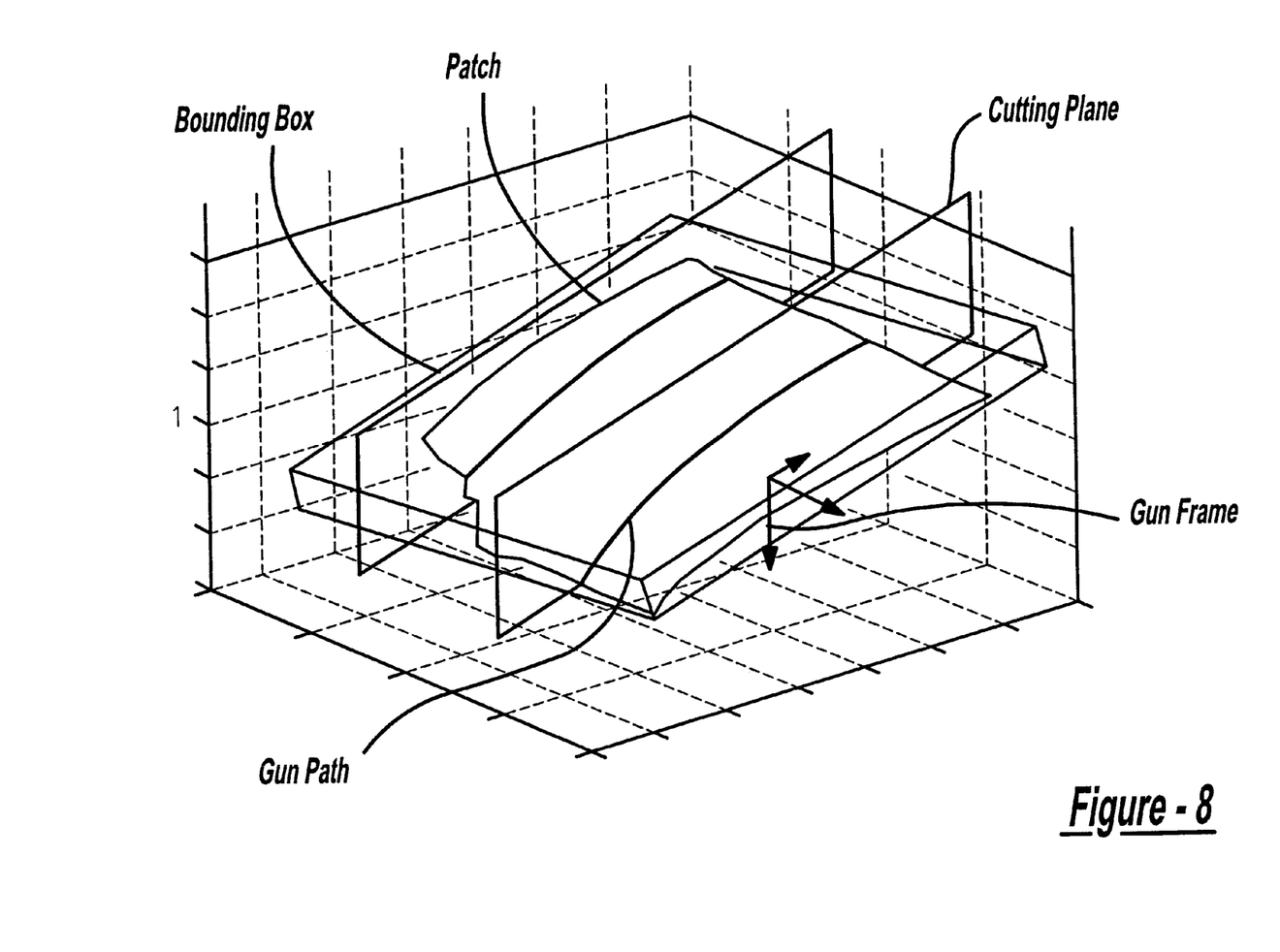
FIG. 8 is a diagram illustration how a paint gun path is determined in relation to a given grouping of facets in accordance with the present invention.

Referring to FIG. 8, the bounding box is then partitioned 124 using parallel cutting planes, such that each cutting plane is perpendicular to the top rectangle of the bounding box. The distance between the cutting planes correspond to the width at which paint is applied by the path gun. It is also envisioned that the distance between cutting planes may be slightly less than this width to allow for some overlap of paint application on the surface of the workpiece.

Within the bounding box, each cutting plane intersects with the groupings of facets along a line. The intersection points which make up this line serve as a path for the paint gun. To determine coordinates for the path, a reference frame is established 126 for each intersection point. The reference frame is established as a z-axis defined in the direction opposite the normal direction of the grouping of facets, and a x-axis defined in the direction at which the paint gun is to move along the path. A y-axis is also defined to complete the right-handed reference frame.

A continuous path run for the paint gun is formed by sequentially connecting 128 the reference frames. Each path run is then connected 130 to form an overall path for the given grouping of facets. Lastly, by sequentially connecting a path run from one grouping of facets to the next grouping of facets, a complete path is formed for the entire surface of the workpiece. The present invention is not limited to these two exemplary approaches for determining a tool path. It should be appreciated that other techniques for determining a tool path which are dependent on the particular manufacturing operation are also within the broader aspects of the present invention.

While the invention has been described in its presently preferred form, it will be understood that the invention is capable of modification without departing from the spirit of the invention as set forth in the appended claims.

What is claimed is:

1. An automated manufacturing system for performing a manufacturing operation along a contoured surface of a workpiece, comprising:

a movable member operable to perform the manufacturing operation along the surface of the workpiece;

a path planning subsystem adapted to receive dimensional data for the workpiece and operable to generate path data based on the dimensional data for the workpiece, where the path data is indicative of a path for traversing the movable member along the surface of the workpiece, the path planning subsystem further including a modeling module receiving the dimensional data for the workpiece and operative to generate a plurality of facets, where each facet is a geometric representation of a portion of the surface of the workpiece, and a grouping module connected to the modeling module and operative to group the plurality of facets into one or more groupings of facets, where facets are grouped based on the spatial orientation of a facet in relation to the spatial orientation of one or more neighboring facets; and a controller adapted to receive the path data from the path planning subsystem and operable to move the moveable member in accordance with the path data, thereby performing the manufacturing operation along the surface of the workpiece.

2. The manufacturing system of claim 1 wherein a tool is located on the movable member for performing the manufacturing operation along the surface of the workpiece.

3. The manufacturing system of claim 2 wherein the path planning subsystem is adapted to receive tool data which is indicative of the type of tool to be used in the manufacturing operation, the path planning subsystem being operable to generate the path data for the tool based in part on the tool data.

4. The manufacturing system of claim 2 wherein the path planning subsystem is adapted to receive operational parameter data which provides parameters within which to perform the manufacturing operation, the path planning subsystem being operable to generate the path data for the tool based in part on the operational parameter data.

5. The manufacturing system of claim 1 wherein the path planning subsystem further comprises a path planning module connected to the grouping module and operative to use the groupings of facets to determine a tool path along the contoured surface of the workpiece.

6. A surface inspection system for inspecting a contoured surface of a workpiece, comprising:

a movable member;

a non-contact sensor located on the movable member for capturing image data representative of the surface of the workpiece;

a path planning subsystem adapted to receive dimensional data for the workpiece and operable to generate path data based on the dimensional data for the workpiece, where the path data is indicative of a path for traversing the sensor along the surface of the workpiece, the path planning subsystem further including a modeling module receiving the dimensional data for the workpiece and operative to generate a plurality of facets, where each facet is a geometric representation of a portion of the surface of the workpiece, and a grouping module connected to the modeling module and operative to group the plurality of facets into one or more groupings of facets and use the groups of facets to determine the path data, where facets are grouped based on the spatial orientation of a facet in relation to the spatial orientation of one or more neighboring facets; and a controller adapted to receive the path data from the path planning subsystem and operable to move the moveable member in accordance with the path data, thereby inspecting the surface of the workpiece.

7. The manufacturing system of claim 6 wherein the path planning subsystem is adapted to receive sensor data which is indicative of operational parameters associated with the non-contact sensor, the path planning subsystem being operable to generate the path data for the non-contact sensor based in part on the sensor data.

8. The manufacturing system of claim 6 wherein the path planning subsystem is adapted to receive operational parameter data which provides parameters within which to perform the surface inspection, the path planning subsystem being operable to generate the path data for the non-contact sensor based in part on the operational parameter data.

9. The manufacturing system of claim 6 wherein the path planning subsystem further comprises a path planning module connected to the grouping module and operative to use the groupings of facets to determine a tool path along the contoured surface of the workpiece.

10. An automated manufacturing system for performing a manufacturing operation along a contoured surface of a workpiece, comprising:

a modeling module receiving the dimensional data for the workpiece and operative to generate a plurality of facets, where each facet is a geometric representation of a portion of the surface of the workpiece;

a grouping module connected to the modeling module and operative to group the plurality of facets into one or more groupings of facets, where facets are grouped based on the spatial orientation of a facet in relation to the spatial orientation of one or more neighboring facets; and a path planning module connected to the grouping module and operative to use the groupings of facets to determine a tool path along the contoured surface of the workpiece.

11. The manufacturing system of claim 10 wherein the path planning module is adapted to receive tool data which is indicative of the type of tool to be used in the manufacturing operation, the path planning module being operable to generate the path data for the tool based in part on the tool data.

12. The manufacturing system of claim 10 wherein the path planning module is adapted to receive operational parameter data which provides parameters within which to perform the manufacturing operation, the path planning module being operable to generate the path data for the tool based in part on the operational parameter data.

13. The manufacturing system of claim 10 further comprising:

a movable member;

a tool located on the movable member operable to perform the manufacturing operation along the surface of the workpiece; and a controller adapted to receive the tool path data from the path planning module and operable to move the moveable member in accordance with the tool path, thereby performing the manufacturing operation along the surface of the workpiece.

14. The automated manufacturing system of claim 1 wherein the grouping module determines a spatial orientation for each of the plurality of facets by determining an area for each facet, determining a vector for each facet, where the vector is indicative of the normal direction of the facet, and computing an area-weighted average normal for each facet by multiplying the area of a facet with the vector for the corresponding facet.

15. The automated manufacturing system of claim 1 wherein the grouping module groups the plurality of facets by (e) identifying a first facet having the largest area amongst the plurality of facets;

(f) identifying a neighboring facet to the first facet;

(g) comparing the spatial orientation of the neighboring facet to the spatial orientation of the first facet; and (h) combining the neighboring facet with the first facet when a difference in spatial orientation between the two facets is within a predefined flatness threshold, thereby forming a first grouping of facets.

16. The automated manufacturing system of claim 15 wherein the grouping module further groups the plurality of facets by repeating steps (f) through (h) for a second neighboring facet when the difference in spatial orientation between the two facets exceeds the predefined flatness threshold.

17. The automated manufacturing system of claim 15 wherein the grouping module further groups the plurality of facets by (i) determining a spatial orientation for the first grouping of facets;

(j) identifying a neighboring facet to the first grouping of facets;

(k) comparing the spatial orientation of the neighboring facet to the spatial orientation of the first grouping of facets; and (l) combining the neighboring facet with the first grouping of facets when the difference in spatial orientation between the neighboring facets and the first grouping of facets is within the predefined flatness threshold.

18. The automated manufacturing system for claim 17 wherein the grouping module further groups the plurality of facets by repeating steps (i) thru (l) until the difference in spatial orientation between each of the neighboring facets and the first grouping of facets exceeds the predefined flatness threshold;

identifying a second facet having the largest area amongst the facets not combined into the first grouping of facets; and repeating steps (f) thru (l) for the second facet, thereby forming a second grouping of facets.

19. The automated manufacturing system of claim 10 wherein the grouping module determines a spatial orientation for each of the plurality of facets by determining an area for each facet, determining a vector for each facet, where the vector is indicative of the normal direction of the facet, and computing an area-weighted average normal for each facet by multiplying the area of a facet with the vector for the corresponding facet.

20. The automated manufacturing system of claim 10 wherein the grouping module groups the plurality of facets by
   (e) identifying a first facet having the largest area amongst the plurality of facets;
   (f) identifying a neighboring facet to the first facet;
   (g) comparing the spatial orientation of the neighboring facet to the spatial orientation of the first facet; and
   (h) combining the neighboring facet with the first facet when a difference in spatial orientation between the two facets is within a predefined flatness threshold, thereby forming a first grouping of facets.

21. The automated manufacturing system of claim 20 wherein the grouping module further groups the plurality of facets by repeating steps (f) through (h) for a second neighboring facet when the difference in spatial orientation between the two facets exceeds the predefined flatness threshold.

22. The automated manufacturing system of claim 20 wherein the grouping module further groups the plurality of facets by
   (i) determining a spatial orientation for the first grouping of facets;
   (j) identifying a neighboring facet to the first grouping of facets;
   (k) comparing the spatial orientation of the neighboring facet to the spatial orientation of the first grouping of facets; and
   (l) combining the neighboring facet with the first grouping of facets when the difference in spatial orientation between the neighboring facets and the first grouping of facets is within the predefined flatness threshold.

23. The automated manufacturing system for claim 22 wherein the grouping module further groups the plurality of facets by
   repeating steps (i) thru (l) until the difference in spatial orientation between each of the neighboring facets and the first grouping of facets exceeds the predefined flatness threshold;
   identifying a second facet having the largest area amongst the facets not combined into the first grouping of facets; and
   repeating steps (f) thru (l) for the second facet, thereby forming a second grouping of facets.

\* \* \* \* \*